(12) United States Patent
Yamada et al.

(10) Patent No.: US 7,027,382 B2
(45) Date of Patent: Apr. 11, 2006

(54) OPTICAL RECORDING MEDIUM HAVING RELATION BETWEEN REFLECTION LAYER AND PIT LENGTHS

(75) Inventors: Katsuyuki Yamada, Zama (JP); Shinya Narumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 64 days.

(21) Appl. No.: 10/179,101

(22) Filed: Jun. 24, 2002

(65) Prior Publication Data

US 2003/0008236 A1    Jan. 9, 2003

(30) Foreign Application Priority Data

Jun. 26, 2001   (JP)   ............... 2001-193779
Jun. 26, 2001   (JP)   ............... 2001-193780

(51) Int. Cl.
G11B 7/24   (2006.01)

(52) U.S. Cl. .............. 369/275.2; 428/64.4; 430/270.13

(58) Field of Classification Search ............ 369/275.2, 369/275.1, 275.5, 280, 275.4, 283, 284, 285, 369/287, 288, 292; 428/69.1, 69.9, 69.3; 430/270.13, 320, 321
See application file for complete search history.

(56) References Cited

U.S. PATENT DOCUMENTS

| | | | |
|---|---|---|---|
| 4,719,613 A * | 1/1988 | Hirose et al. | 369/275.1 |
| 4,766,054 A * | 8/1988 | Hirose et al. | 430/270.17 |
| 5,646,924 A | 7/1997 | Nonoyama et al. | 369/58 |
| 5,674,599 A | 10/1997 | Yamada | 428/212 |
| 5,736,657 A | 4/1998 | Ide et al. | 75/230 |
| 5,785,828 A | 7/1998 | Yamada et al. | 204/298.13 |
| 5,889,756 A * | 3/1999 | Ichihara et al. | 369/275.2 |
| 5,974,025 A | 10/1999 | Yamada et al. | 369/288 |
| 6,007,889 A | 12/1999 | Nee | |
| 6,127,016 A | 10/2000 | Yamada et al. | 428/64.1 |
| 6,280,810 B1 | 8/2001 | Nakamura et al. | 428/64.1 |
| 6,280,811 B1 | 8/2001 | Nee | |
| 6,319,368 B1 | 11/2001 | Ide et al. | 204/192.26 |
| 6,544,616 B1 | 4/2003 | Nee | |
| 6,632,583 B1 * | 10/2003 | Kunitomo et al. | 369/275.5 |
| 6,764,735 B1 | 7/2004 | Nee | |
| 6,826,144 B1 * | 11/2004 | Ichihara et al. | 369/288 |

FOREIGN PATENT DOCUMENTS

| | | |
|---|---|---|
| EP | 0 594 516 A2 | 4/1994 |
| JP | 57186244 | 11/1982 |
| JP | 03216829 | 12/1991 |
| JP | 07003363 | 1/1995 |
| JP | 7-105575 | 4/1995 |
| JP | 09063118 | 3/1997 |
| JP | 09156224 | 6/1997 |
| JP | 10-011799 | 1/1998 |
| JP | 10011799 | 1/1998 |
| JP | 2749080 | 5/1998 |
| JP | 00285517 | 10/2000 |

* cited by examiner

*Primary Examiner*—Tan Dinh
(74) *Attorney, Agent, or Firm*—Cooper & Dunham LLP (57) ABSTRACT

An optical information recording medium including a substrate, a light absorbing layer which is located overlying the substrate and in which marks are formed to store information and a light reflection layer located overlying the light absorbing layer including a crystal, wherein the optical information recording medium satisfies the relationship, $Lt/4 \leq Lc \leq Lm$, wherein Lc represents the average particle diameter of the crystal of the light reflection layer, Lm represents the minimum length of the marks, and Lt represents the thickness of the light reflection layer.

11 Claims, 2 Drawing Sheets

OPTICAL RECORDING MEDIUM HAVING RELATION BETWEEN REFLECTION LAYER AND PIT LENGTHS

BACKGROUND OF THE INVENTION

1. Field of the Invention

The present invention relates to an optical information recording medium, and particularly to an optical information recording medium in which information is recorded, reproduced and rewritten by changing an optical property of a light absorbing layer thereof by irradiating the light absorbing layer with a laser light beam. More particularly, the present invention relates to an optical recording medium which can be used as a CD-ROM or a DVD-ROM such as CD-R media, CD-RW media, DVD-R media, DVD-RW media, DVD+R media and DVD+RW. In addition, the present invention also relates to an information recording method using the optical information recording medium.

2. Discussion of the Related Art

Various optical information recording media capable of recording, reproducing and erasing information upon irradiation of laser light thereto have been developed and used. Specific examples of such optical information recording media include magneto-optical media, CD-R media, CD-RW media, DVD-R media, DVD-RW media, DVD+R media, DVD+RW media and DVD-ROM media. Now, there is a need to record a larger amount of information at a higher speed. Therefore, a need exists for optical information recording media which can perform high density recording at high linear recording speed.

In attempting to satisfy the need, light reflection layers which include a material having both high reflectance and high heat conductivity, such as Au, Ag, Cu and Al, have been investigated. In particular, there are great expectations for a light reflection layer including Ag which has the highest reflectance and heat conductivity among metals.

When a light reflection layer including Ag is used for optical information recording media, the recording media have the following advantages:

(A) the recording medium increases has high light reflectance over a broad wavelength range;
(B) signal amplitude of the resultant medium can be increased because Ag has good optical characteristics;
(C) when the light reflection layer is used for a phase-change optical recording medium, the number of overwriting can be increased if the light reflection layer is made by a rapid cooling method;
(D) when the light reflection layer is used for a phase-change optical recording medium, recording speed (linear speed) can be increased if the light reflection layer is made by a rapid cooling method;
(E) productivity can be increased because Ag has high sputtering efficiency; and
(F) since the sputtering time taken for forming the light reflection can be decreased, the quantity of heat stress applied to the recording medium can be decreased, resulting in improvement of the mechanical properties of the resultant recording medium.

However, recording media having a light reflection layer including Ag have the following drawbacks:

(G) the light reflection layer is easily corroded under high temperature and high humidity conditions;
(H) the light reflection layer is easily corroded by sulfur and chlorine;
(I) adhesion of the light reflection layer with a layer on which the reflection layer is formed is relatively small;
(J) since Ag is a noble metal, the light reflection layer is more expensive than a layer made of Al, etc.; and
(K) when a substrate having a thickness of 0.6 mm is used, the resultant recording medium has abnormal mechanical properties due to membrane stress of the Ag film.

In order to prevent corrosion of Ag reflection layers, the following methods have been disclosed.

(1) a silver alloy, AgCu, is used for the light reflection layer (Japanese Laid-Open Patent Publication No. 57-186244);
(2) a silver alloy, AgMg, is used for the light reflection layer (Japanese Laid-Open Patent Publication No. 7-3363);
(3) a silver alloy, AgOM (M represents Sb, Pd or Pt), is used for the light reflection layer (Japanese Laid-Open Patent Publication No. 9-156224); and
(4) a silver alloy, AgPdCu, is used for the light reflection layer (Japanese Laid-Open Patent Publication No. 2000-285517).

In addition, Japanese Patent No. 2,749,080 discloses a light reflection layer which includes Ag and another element such as Ti, V, Fe, Co, Ni, Zn, Zr, Nb, Mo, Rh, Pd, Sn, Sb, Te, Ta, W, Ir, Pt, Pb, Bi and C, to control the heat conductivity of the light reflection layer.

However, when CD-R media, CD-RW media, DVD-RW media, DVD+R media and DVD+RW media are prepared while these materials are used as their reflection layer and information is recorded therein, the recorded signals have unsatisfactory reflectance and signal amplitude.

This is because when such a metal is added to Ag in an amount not less than 1% by weight, Ag loses its advantages, i.e., high reflectance and high heat conductivity.

In addition, when the archival high temperature preservation reliability of the above-mentioned recording media is evaluated, it is found that reproduction errors increase if the media are preserved for 300 hours under an environmental condition of 80° C. and 85% RH. Namely, the recording media have unsatisfactory preservation reliability.

Further, when such light reflection layers are used for laminated recording media such as DVD+RW media and the substrates have a thickness as thin as 0.6 mm, the substrates tend to deform due to heat stress and internal stress of the light reflection layers, and thereby an information recording/reproducing problem occurs.

SUMMARY OF THE INVENTION

Accordingly, an object of the present invention is to provide an optical information recording medium which has good preservation reliability, good mechanical properties, high productivity and high speed recording ability.

Another object of the present invention is to provide an information recording method in which information can be securely recorded in an optical information recording medium at a high speed.

To achieve such an object, the present invention contemplates the provision of an optical information recording medium including a substrate, a light absorbing layer which is located overlying the substrate and in which marks are formed to store information and a light reflection layer which is located overlying the light absorbing layer and includes a crystal, wherein the optical information recording medium satisfies the following relationship:

$$Lt/4 \leq Lc \leq Lm$$

wherein Lc represents the average particle diameter of the crystal of the light reflection layer; Lm represents the minimum length of the marks formed in the light absorbing layer; and Lt represents the thickness of the light reflection layer.

The optical information recording medium preferably satisfies the following relationship:

$Lt/3 \leq Lc \leq Lm$.

The light reflection layer preferably includes Ag having a purity not lower than 99% by weight and at least one metal which has a normal electrode potential lower than that of Ag, wherein the metal is included in the light reflection layer in an amount of from 0.00005 to 0.005% by weight based on the weight of Ag included in the light reflection layer.

The metal having a normal electrode potential lower than that of Ag is preferably selected from the group consisting of Al, Bi, Ca, Cu, Cd, Fe, Mn, Mg, Ni, Pd, Pb, Sb and Zn.

The metal having a normal electrode potential lower than that of Ag is preferably present at the grain boundary of the Ag crystal or Ag alloy crystal.

The light reflection layer preferably includes Ag in an amount not less than 99% by weight, and more preferably not less than 99.9% by weight based on the total weight of the light reflection layer.

In the another aspect of the present invention, an information recording method is provided which includes the step of forming marks in an optical information recording medium including a substrate, a light absorbing layer overlying the substrate and in which the marks, having a mark length Lm, are formed to store information; and a light reflection layer having a thickness Lt overlying the light absorbing layer and including crystals with an average particle diameter Lc such that $Lt/4 \leq Lc \leq Lm$.

Alternatively, an information recording method is provided which includes the step of applying light irradiation to an optical information recording medium to form marks therein, with a minimum mark length Lm, wherein the optical information recording medium includes a substrate, a light absorbing layer overlying the substrate and in which the marks are formed to store information, and a light reflection layer having a thickness Lt overlying the light absorbing layer and including crystals with an average particle diameter Lc such that $Lt/4 \leq Lc \leq Lm$.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

The optical information recording medium (hereinafter sometimes referred to as the recording medium) of the present invention will be explained in detail.

As a result of the present inventors' investigation of remedying the drawbacks of the Ag light reflection layer mentioned above, it is found that the light reflection layer preferably includes Ag in an amount not less than 99% by weight, and more preferably not less than 99.9% to increase the reflectance of the light reflection layer to 90% or more.

In addition, it is found that the grain boundary of the crystal of Ag and/or Ag alloy included in the Ag light reflection layer has a thermal property largely different from that of the crystal of Ag and/or Ag alloy. Namely, when a record mark is formed in the recording medium upon application of light irradiation thereto, the shape and length of the recorded mark vary (i.e., the jitter increases) depending on whether or not the recorded area of the light reflection layer has a crystal grain boundary.

The present inventors record information in various DVD+RW media having a light reflection layer having different average crystal particle diameters (Lc) while adopting a most suitable recording strategy. The relationship between the average crystal particle diameters (Lc) and jitter of the recorded signals, which is obtained as a result of the experiment, is illustrated in FIG. 5.

In this experiment, the average crystal particle diameter (Lc) is controlled so as to be predetermined values by changing the temperature of the substrate, and film forming speed and film forming pressure of the light reflection layer. The minimum length (Lm) of the marks recorded in the DVD+RW media is 0.4 μm.

Figure 5:
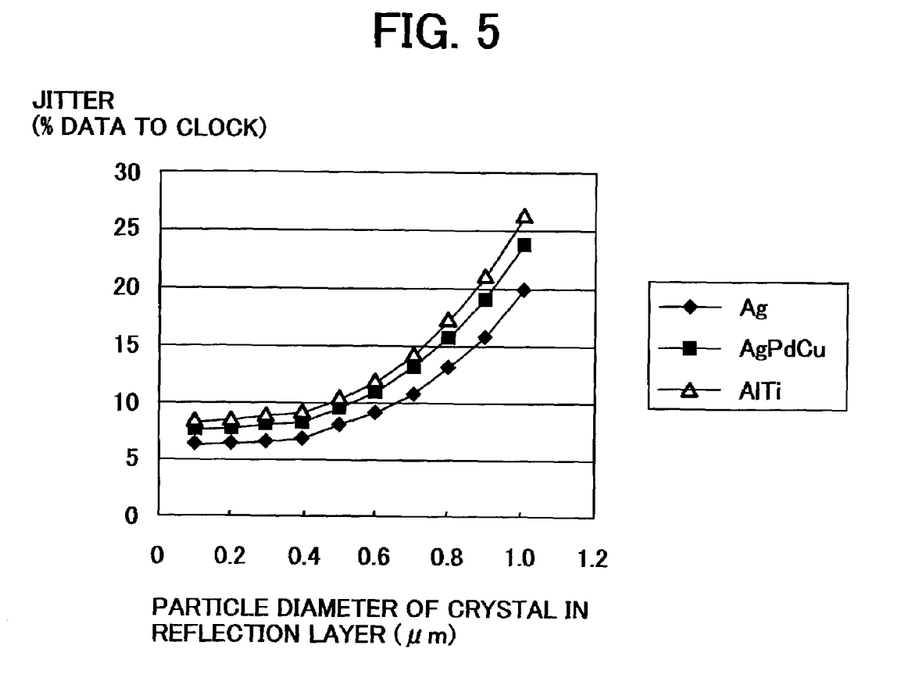
FIG. 5 is a graph illustrating the relationship between a particle diameter of the crystal included in the light reflection layer and a characteristic (jitter) of recorded signals.

As can be understood from FIG. 5, when the average crystal particle diameter (Lc) exceeds the minimum mark length (i.e., 0.4 μm), the jitter of the recorded signals increases. This test result is also obtained for the light reflection layer made of AgPdCu or AlTi as well as the light reflection layer made of Ag. As can be understood from FIG. 5, the Ag light reflection layer yields the best results, and the AgPdCu light reflection layer yield better results than the AlTi light reflection layer.

Therefore it can be understood from the test results that the average crystal particle diameter (Lc) is not greater than the minimum mark length (Lm).

In addition, the crystal particle diameter of a light reflection layer influences the mechanical properties of the recording medium, particularly bending of the substrate of the recording medium. The mechanism is as follows:

When a light reflection layer, which has been formed in vacuum, is exposed to the atmosphere, water vapor (water molecule) penetrates the crystal grain boundary of the light reflection layer, resulting in formation of a compound such as oxides and thereby the volume of the light reflection layer increases.

In this case, water molecule penetrates from the surface of the light reflection layer and therefore the cubical expansion rate of the surface portion of the light reflection layer is different from that of the inner portion thereof, resulting in formation of internal stress in the light reflection layer.

When the crystal particle diameter of the light reflection layer is relatively large, the internal stress relaxation decreases and thereby the recording medium is largely deformed. When the thickness of the light reflection layer is almost the same as the particle diameter of the crystal in the light reflection layer, the internal stress caused by water molecule is hardly relaxed and thereby tensile stress is produced in the substrate. In contrast, when the particle diameter of the crystal in the light reflection layer is sufficiently smaller than the thickness of the light reflection, the internal stress can be relaxed and therefore tensile stress is not formed in the substrate.

However, when the particle diameter of the crystal in the light reflection layer is too small, the light reflectance and heat conductivity of the light reflection layer seriously decrease and therefore it is not preferable. In order not to produce the tensile stress while the light reflectance and/or heat conductivity are maintained, the average particle diameter (Lc) of the crystal in the light reflection layer is not less than one fourth of the thickness (Lt) of the light reflection layer (i.e., Lt/4≦Lc) and preferably not less than one third of the thickness (Lt) of the light reflection layer (i.e., Lt/3≦Lc).

Figure 6:
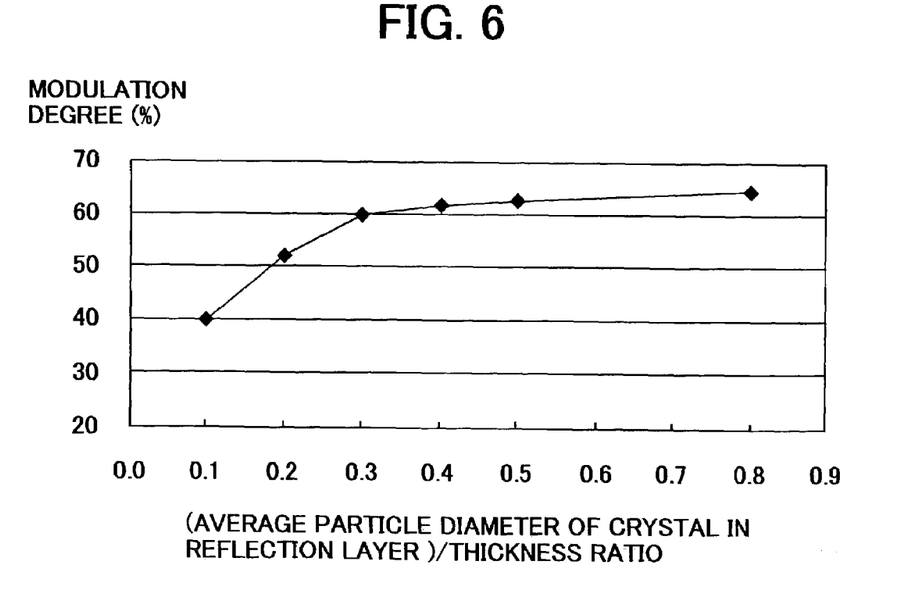
FIG. 6 is a graph illustrating the relationship between a ratio (Lc/Lt) of the average particle diameter (Lc) of the crystal in the light reflection layer to the thickness (Lt) thereof and modulation of recorded signals.

FIG. 6 is a graph illustrating the relationship between a ratio (Lc/Lt) of the average particle diameter (Lc) of the crystal in the light reflection layer to the thickness (Lt) thereof and modulation of recorded signals.

Since the modulation of recorded signals influence the reproduction ability in DVD-ROMs and CD-ROMs, the modulation is preferably not less than 55% and more preferably not less than 60%.

As can be understood from FIG. 6, in order to prepare an optical information recording medium having a modulation not less than 55% and not less than 60%, the ratio Lc/Lt is preferably not less than 1/4 (i.e., Lt/4≦Lc) and not less than 1/3 (i.e., Lt/3≦Lc), respectively.

In phase-change optical recording media, the thermal properties and optical properties of the light reflection layer are important factors. For example, a recording medium is prepared by forming a first protective layer constituted of $ZnS.SiO_2$ and having a thickness of 80 nm, a recording layer constituted of AgInSbTe and having a thickness of 16 nm, a second protective layer constituted of $ZnS.SiO_2$ and having a thickness of 20 nm, and a reflection layer constituted of Ag—Cu and having a thickness of 140 nm on a substrate in this order. When laser light having a wavelength of 650 nm irradiates the thus prepared recording medium to perform recording and reproducing, the characteristics of the recorded signals are shown in Table 1.

TABLE 1

| Purity of Ag used for reflection layer (% by weight) | Reflectance (%) | Modulation (%) |
| --- | --- | --- |
| 95 | 18.5 | 48 |
| 97 | 18.8 | 52 |
| 99 | 19.0 | 56 |
| 99.9 | 19.2 | 61 |
| 99.99 | 19.2 | 63 |

As can be understood from Table 1, the modulation of the recorded signals largely change depending on the purity of Ag. As mentioned above, the modulation is needed to be not less than 55% and preferably not less than 60%, and therefore the purity of Ag is not less than 99%, preferably not less than 99.9% and more preferably not less than 99.99%.

However, when Ag having a high purity not less than 99% by weight is used for the reflection layer for the reasons as mentioned above, the high-temperature/high-humidity preservability of the resultant recording medium is not satisfactory, namely the reflectance of the medium deteriorates.

The present inventors have investigated the mechanism of the deterioration of the reflectance. As a result thereof, it is found that when sulfur-containing compounds and/or chlorine-containing compounds contact Ag in the presence of water ($H_2O$), Ag is ionized and thereby the light reflection layer is corroded. This corrosion proceeds along the grain boundary of Ag crystals in the reflection layer because the sulfur-containing compounds and/or chlorine-containing compounds contacting the surface of Ag penetrate into the reflection layer along the grain boundary in combination with water.

The present inventors discover based on the thus obtained knowledge that by adding a metal having a relatively small normal electrode potential compared to Ag to the light reflection layer in an amount such that the light reflectance and heat conductivity of Ag are not deteriorated (i.e., the resultant light reflection layer have desired light reflectance and heat conductivity), the ionization problem of Ag can be avoided.

Specifically, it is effective to include a metal having a relatively small normal electrode potential compared to Ag in the light reflection layer in an amount of from 0.00005 to 0.005% by weight based on the weight of Ag included in the reflection layer.

Suitable metals for use as such a metal include metals having good compatibility with Ag, such as Al, Bi, Ca, Cu, Cd, Fe, Mn, Mg, Ni, Pd, Pb, Sb and Zn.

As can be understood from the corrosion mechanism mentioned above, the ionization problem of Ag can be effectively avoided when the metal having a relatively small normal electrode potential is present in the grain boundary of the Ag and/or Ag alloys in the reflection layer. In order to form a light reflection layer having such a constitution as mentioned above, it is needed to fully grow Ag crystals in the film forming process while moving the added metal to the grain boundary of the crystals of Ag and/or Ag alloys in the reflection layer by controlling the substrate temperature, film forming speed, film forming pressure, etc.

Specifically, by performing film formation of the reflection layer while the substrate is heated to a high temperature, the film forming speed is increased and the film forming pressure is decreased, the added metal can be effectively moved to the grain boundary of Ag crystals.

The light reflection layer of the optical information recording medium of the present invention can be prepared by a method such as vapor-phase growth methods, e.g., vacuum vapor deposition methods, sputtering methods, plasma CVD methods, light CVD methods, ion plating methods, electron beam deposition methods, etc.

The thickness of the Ag or Ag-alloy light reflection layer is preferably 50 nm to 200 nm, and more preferably from 70 nm to 160 nm. In addition, the light reflection layer may be multi-layered. When the light reflection layer is multi-layered, the thickness of each of the layers is preferably not less than 10 nm, and the total thickness of the layered light reflection layer is preferably from 50 nm to 160 nm. When the light reflection layer is used as a semi-transparent reflection layer of layered recording layer, the thickness of the reflection layer is preferably from 10 nm to 50 nm.

Embodiments of the optical information recording medium of the present invention are illustrated in FIGS. 1 to 4.

Figure 1:
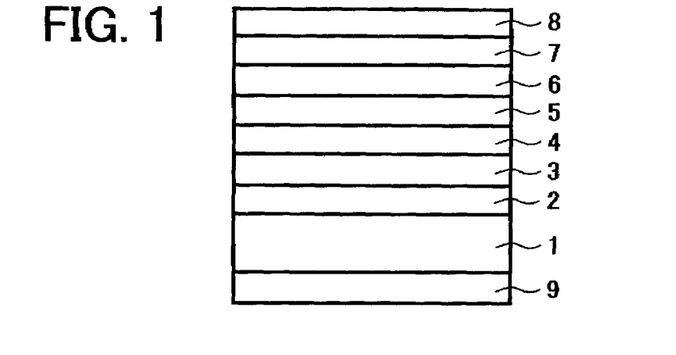
FIG. 1 is a schematic view illustrating the cross section of an embodiment of the optical information recording medium of the present invention.

FIG. 1 is a schematic view illustrating the cross section of an embodiment of the optical information recording medium of the present invention.

The recording medium has a structure in which a lower protective layer 2, a light absorbing layer 3, a first upper protective layer 4, a Ag-type light reflection layer 6 and an overcoat layer 7 which are overlaid in this order on one side of a transparent substrate 1 having a guide groove. It is preferable that a second upper protective layer 5 is formed on the first upper protective layer 4. A print layer 8 maybe formed on the overcoat layer 7, and a hard coat layer 9 may be formed on the other side (i.e., backside) of the transparent substrate 1. Hereinafter the combination of the transparent substrate with the layers 2–7 is referred to as a single plate disc.

Figure 2:
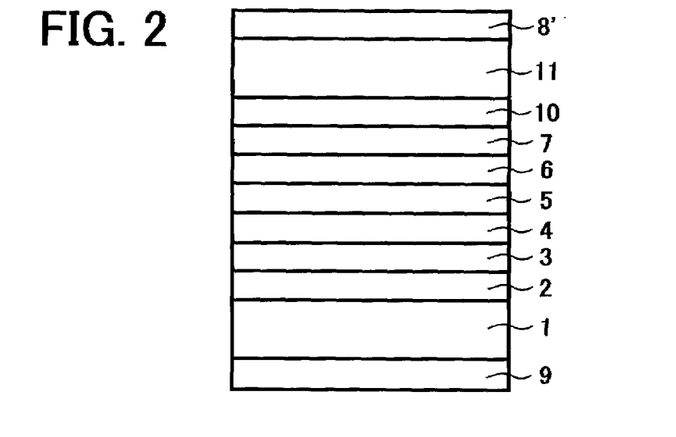
FIG. 2 is a schematic view illustrating the cross section of another embodiment of the optical information recording medium of the present invention in which another substrate or single plate disc is bonded with the optical information recording medium as shown in FIG. 1.

FIG. 2 is a schematic view illustrating the cross section of another embodiment of the optical information recording medium of the present invention (i.e., a laminated type optical information recording medium). In FIG. 2, another single plate disc 11 (i.e., the combination of a substrate, lower protective layer, light absorbing layer and first upper protective layer (optionally including the second upper protective layer), reflection layer and an overcoat layer, is formed on the overcoat layer 7 of the optical information recording medium as illustrated in FIG. 1 with an adhesive layer 10 therebetween. The second single plate disc 11 may be replaced with a transparent substrate 11. As shown in FIG. 2, print layer 8' and/or a hard coat layer 9 may be formed on the surface of the second single plate disc 11 and the transparent substrate 1, respectively. In addition, the overcoat layer 7 may also serve as the adhesive layer 10.

Figure 3:
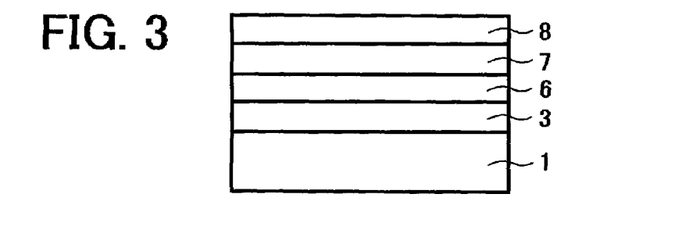
FIG. 3 is a schematic view illustrating the cross section of yet another embodiment of the optical information recording medium of the present invention for use as a CD-R or DVD-R.

When the optical information recording medium of the present invention is used as a CD-R medium or DVD+R medium, it is preferable that the lower protective layer 2, first upper protective layer 4 and second upper protective layer 5 are not formed as shown in FIG. 3 because the optical sensitivity can be improved and in addition costs of the recording medium can be reduced.

Figure 4:
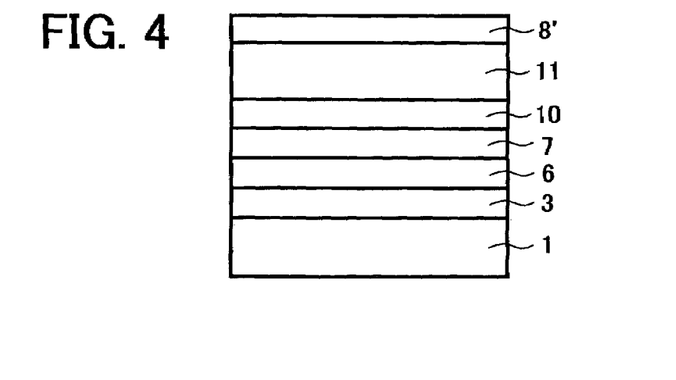
FIG. 4 is a schematic view illustrating the cross section of a further embodiment of the optical information recording medium of the present invention in which another substrate or single plate disc is bonded with the optical information recording medium as shown in FIG. 3.

The optical information recording medium illustrated in FIG. 4 is a laminated type of the optical information recording medium as illustrated in FIG. 3.

By irradiating these optical information recording media with laser light, optical change or shape distortion is made in the light absorbing layer, resulting in record of information therein.

Specific examples of the materials for use as the transparent substrates 1 and 1' include glass, ceramics, and resins. Among these materials, resins are preferable in view of moldability and manufacturing costs. Specific examples of the resins for use as the transparent substrates 1 and 1' include polycarbonate resins, acrylic resins, epoxy resins, polystyrene resins, acrylonitrile-styrene copolymers, polyethylene resins, polypropylene resins, silicone resins, fluorine-containing resins, ABS resins, urethane resins, etc. Among these resins, polycarbonate resins and acrylic resins are preferably used because of having good moldability, good optical properties and low costs.

When the optical information recording medium of the present invention is used as a DVD-ROM compatible rewritable optical information recording medium, the recording medium preferably satisfies the following specific conditions:

(1) the width of the guide groove formed on the substrate is 0.10 μm to 0.40 μm and more preferably from 0.15 μm to 0.35 μm;
(2) the depth of the guide groove is 15 nm to 45 nm and more preferably from 20 nm to 40 nm;
(3) the thickness of the substrate is preferably 0.55 mm to 0.65 mm; and
(4) the total thickness of the laminated optical information recording medium is preferably from 1.1 to 1.3 mm.

When satisfying such conditions, the optical information recording medium has an improved DVD-ROM drive reproduction compatibility.

When the optical information recording medium of the present invention is used as a CD-RW medium, the width of the guide groove is preferably from 0.25 μm to 0.65 μm and more preferably from 0.30 μm to 0.60 μm, and the depth of the guide groove is preferably from 20 nm to 50 nm and more preferably from 25 nm to 45 nm.

Suitable phase-change materials for use in the light absorbing layer include materials including Sb and Te which can change their phase from a crystal phase to an amorphous phase or vice versa, wherein each of the crystal phase and amorphous phase is a stable state or a semi-stable state. When the formula of the light absorbing layer is $Sb_xTe_{100-x}$, X is preferably from 40 to 80 by atomic % because the resultant optical information recording medium has good recording sensitivity and recording speed (i.e., the phase can be changed at a high speed from a crystal phase to an amorphous state), good erasing sensitivity and erasing speed (i.e., the phase can be changed at a high speed from an amorphous phase to a crystal state) and good erasure ratio.

By including one or more of elements such as Ga, Ge, Ag, In, Bi, C, N, O, Si and S into the SbTe recording materials, the recording sensitivity, erasing sensitivity, signal properties and reliability of the recording materials can be controlled. The addition amount of these elements is preferably from 0.1 to 20 atomic % and more preferably from 0.1 to 15 atomic %. When the addition amount is less than 0.1 atomic %, the effects mentioned above are hardly exerted. To the contrary, when the addition amount is greater than 20 atomic %, initialization (i.e., crystallization) cannot be satisfactorily performed.

A phase-change light absorbing layer constituted of an alloy is needed to be able to record and erase information and in addition the signals recorded therein at a high linear recording speed and in a high density have to have good reproduction stability and long life (i.e., good reliability). In order to fulfill such requirements, the formula of the phase-change light absorbing layer is preferably $(Ag\ and/or\ Ge)_\alpha (In\ and/or\ Ga\ and/or\ Bi)_\beta Sb_\gamma Te_\delta$ and in addition α, β, γ and δ (atomic %) satisfy the following relationships:

$$0.001 \leq \alpha/(\alpha+\beta+\gamma+\delta) \leq 0.07$$

$$0.01 \leq \beta/(\alpha+\beta+\gamma+\delta) \leq 0.15$$

$$0.60 \leq \gamma/(\alpha+\beta+\gamma+\delta) \leq 0.90$$

$$0.15 \leq \delta/(\alpha+\beta+\gamma+\delta) \leq 0.30.$$

It is preferable to use materials having a cubic crystal form (i.e., an isotropic crystal form), and more preferably a NaCl crystal form when the materials are initialized but information is not recorded in the materials in the light absorbing layer. This is because the phase is stably changed from the to cubic crystal form to an amorphous phase which is also considered to be highly isotropic, and thereby recording (i.e., amorphism, namely making into an amorphous state) and erasing (i.e., crystallization) can be stably performed at a high speed.

The thickness of the above-mentioned alloy-type phase-change light absorbing layer is preferably from 10 nm to 50 nm and more preferably from 12 nm to 30 nm. In addition, when taking the initial jitter property, overwriting property and production efficiency into consideration, the thickness is preferably from 14 nm to 25 nm. When the thickness is less than 10 nm, the light absorbing ability tends to seriously deteriorate and thereby the light absorbing layer does not play the role. To the contrary, when the thickness is greater than 50 nm, phase changing does not stably performed at a high speed.

The light absorbing layer can be prepared by a method such as vapor-phase growth methods, e.g., vacuum vapor deposition methods, sputtering methods, plasma CVD methods, light CVD methods, ion plating methods, electron beam deposition methods, etc. Among these methods, sputtering methods are preferable because the methods have good productivity and the resultant light absorbing layer has good film properties.

The light absorbing layer may be a dye-type light absorbing layer. Specific examples of the dye for use in the dye-type light absorbing layer include compounds which can absorb the recording light, such as cyanine dyes, pyrylium dyes, thiopyrylium dyes, azulenium dyes, squarilium dyes, metal complex dyes including Ni or Cr, naphthoquinone dyes, anthraquinone dyes, indophenol dyes, indoaniline dyes, triphenylmethane dyes, triarylmethane dyes, aminium dyes, diimmonium dyes, nitroso compounds, azo dyes, and phthalocyanine dyes. These compounds can be used alone or in combination. In addition, a binder resin and/or a photo-stabilizer can be included in the dye-type light absorbing layer.

The thickness of the dye-type light absorbing layer is preferably from 10 nm to 500 nm, and more preferably from 50 to 300 nm. When the dye-type light absorbing layer is too thin, the signal amplitude deteriorates and in addition the recording sensitivity deteriorates. To the contrary, the dye-type light absorbing layer is too thick, the reflectance of the light absorbing layer deteriorates. Therefore the thickness of the light absorbing layer is determined while taking these points into consideration.

The dye-type light absorbing layer is typically prepared by coating an organic solvent solution of a light absorbing dye on a substrate using a spin coating method. In this case, the revolution of the rotated substrate is preferably controlled such that the resultant dye-type light absorbing layer has a desired thickness.

Further, magneto-optical recording materials such as FeTbCo can also be used for the light absorbing layer (i.e., the recording layer).

These recording layers are preferably used alone, however, multi-layered recording layers can be used. In this case, it is possible to insert a dielectric layer between the multi-layered recording layers. In addition, a combination of a phase-change light absorbing layer with a dye-type light absorbing layer; and a combination of a phase-change light absorbing layer with a magneto-optical recording layer, can also be used. By using such combination recording layers, it becomes possible to record and reproduce information in the optical recording medium using a recording apparatus which uses different light for recording and reproducing.

Then the lower and upper protective layers will be explained. Suitable materials for use in the lower and upper protective layers include metal oxides such as SiO, $SiO_2$, ZnO, $SnO_2$, $Al_2O_3$, $TiO_2$, $In_2O_3$, MgO and $ZrO_2$; nitrides such as $Si_3N_4$, AlN, TiN, BN and ZrN; sulfides such as ZnS, $In_2S_3$ and $TaS_4$; carbides such as SiC, TaC, $B_4C$, WC, TiC and ZrC; and diamond-like carbon. These materials can be used alone or in combination.

The second upper protective layer preferably includes at least one of the materials of C, Si, SiC, SiN, SiO and $SiO_2$.

These materials can be used alone or in combination for the lower and upper protective layers. In addition, an additive can be included in the lower and upper protective layers if desired. Each of the lower and first and second upper protective layers preferably has a melting point higher than that of the recording layer.

The lower and first and second upper protective layers can be prepared, for example, by a method such as vapor-phase growth methods, e.g., vacuum vapor deposition methods, sputtering methods, plasma CVD methods, light CVD methods, ion plating methods, electron beam deposition methods, etc. Among these methods, sputtering methods are preferable because the methods have good productivity and the resultant light absorbing layer has good film properties.

The thickness of the lower protective layer influences on the reflectance, modulation and recording sensitivity of the recording medium. In order to prepare a recording medium having good signal characteristics, the thickness of the lower protective layer is preferably from 60 nm to 120 nm.

The thickness of the first upper protective layer is preferably from 5 nm to 45 nm and more preferably from 7 nm to 40 nm. When the first upper protective layer is thinner than 5 nm, the first upper protective layer tends not to function as a heat resistant protective layer and in addition the recording sensitivity tends to deteriorate. To the contrary, when the first upper protective layer is thicker than 45 nm, the protective layer tends to peel from the adjacent layers and in addition recording properties tend to deteriorate after repeated use.

The thickness of the second upper protective layer is preferably from 1 nm to 20 nm, more preferably from 2 nm to 10 nm and even more preferably from 3 nm to 7 nm. The second upper protective layer is needed to serve as a chemically-inactive layer and/or a heat releasing layer between the Ag-type light reflection layer and the first upper protective layer. When the second upper protective layer is too thin, the materials included in the Ag-type reflection layer or first upper protective layer easily move into each other and therefore the second upper protective layer does not serve as the chemically-inactive layer. In contrast, when the second upper protective layer is too thick, the number of overwriting decreases and the reflectance of the recording medium decreases. Thus, the thickness of the second upper protective layer should be determined while taking consideration of the chemical inactiveness, and the targeted number of overwriting and reflectance.

The overcoat layer is formed on the second upper protective layer (i.e., the heat releasing layer), to prevent oxidation of the second upper protective layer. The overcoat layer is preferably a layer formed of an ultraviolet crosslinking resin using a spin coating method. The thickness of the overcoat layer is from 3 µm to 15 µm. When the thickness of the overcoat layer is less than 3 µm, a problem tends to occur in that error rate increases in reproducing recorded signals if the print layer is formed on the overcoat layer. To the contrary, when the thickness is greater than 15 µm, the internal stress increases in the recording medium, resulting in deterioration of the mechanical properties of the recording medium.

The hard coat layer is typically formed by coating an ultraviolet crosslinking resin using a spin coating method. The thickness of the hard coat layer is preferably from 2 μm to 6 μm. When the thickness of the hard coat layer is less than 2 μm, the abrasion resistance of the hard coat layer is not satisfactory. To the contrary, when the thickness is greater than 6 μm, the internal stress increases in the recording medium, resulting in deterioration of the mechanical properties of the recording medium. It is preferable that the hard coat layer is not hurt when the surface thereof is rubbed with a cloth, i.e., the hard coat layer preferably has a pencil hardness of H or harder when the hardness is evaluated by a method based on JIS K5400. In addition, it is also preferable to add an electroconductive material in the hard coat layer to prevent the hard coat layer from charging, i.e., to prevent adhesion of dust to the layer.

The print layer is formed to improve the abrasion resistance of the recording medium, and to print characters and images such as trade names. In addition, a receiving layer on which characters and/or images are formed by an inkjet recording method or the like method may be formed as the print layer. The print layer is typically formed by coating an ultraviolet crosslinking resin using a screen printing method, etc.

The thickness of the print layer is preferably from 3 μm to 50 μm. When the print layer is thinner than 3 μm, the print layer tends to be unevenly formed. When the print layer is thicker than 50 μm, the internal stress seriously increases in the recording medium, and thereby the mechanical properties of the recording medium are deteriorated.

Suitable materials for use in the adhesive layer include ultraviolet crosslinking adhesives, hot melt adhesives, silicone adhesives, etc. The adhesive layer is typically formed on the overcoat layer or print layer by coating such an adhesive by a method such as spin coating, roll coating and screen coating methods. Then a transparent substrate or another single plate disc is adhered thereon while the adhesive layer (i.e., the combination disc) is subjected to an ultraviolet irradiation treatment, a heating treatment and/or a pressing treatment.

The adhesive layer 10 may be coated on a surface of the second transparent substrate (or the second single plate disc 11) and/or a surface of the print layer 8 (or the overcoat layer 7) of the single plate disc.

In addition, an adhesive sheet can be used as the adhesive layer 10.

The thickness of the adhesive layer is not particularly limited, but is preferably from 5 μm to 100 μm and more preferably from 7 μm to 50 μm, in view of coating quality and crosslinking property of the adhesive layer and mechanical properties of the resultant disc.

The area of a portion of the second transparent substrate (or the second single plate disc and/or the print layer or the overcoat layer) on which an adhesive is applied is not particularly limited. However, when the adhesive layer is applied to DVD and/or CD compatible optical information recording media, the distance between the inside end of the portion and the center of the recording media is preferably from 15 mm to 40 mm, and more preferably from 15 mm to 30 mm such that the high speed recording can be performed on the recording medium.

In addition, the glass transition temperature of the adhesive layer is preferably not higher than 100° C. to impart impact resistance to the resultant optical information recording medium.

Having generally described this invention, further understanding can be obtained by reference to certain specific examples which are provided herein for the purpose of illustration only and are not intended to be limiting.

EXAMPLES

Example 1

A polycarbonate substrate which has a thickness of 0.6 mm and in which a guide groove having a width of 0.25 μm and a depth of 27 nm is formed was prepared by an injection molding method. On the polycarbonate substrate, a lower protective layer of $ZnS.SiO_2$ (the content of $SiO_2$ is 20 mole %) having a thickness of 80 nm, a light absorbing layer having a formula of $Ag_{0.5}Ge_{1.5}In_8Sb_{70}Te_{20}$ and a thickness of 16 nm, a first upper protective layer of $ZnS.SiO_2$ (the content of $SiO_2$ is 20 mole %) having a thickness of 11 nm, a second upper protective layer of SiC having a thickness of 4 nm and a Ag light reflection layer having a thickness of 140 nm and made of Ag having a purity of 99.99% by weight in which Cu is added in an amount of 0.003% by weight were formed in this order by sputtering.

Thus, the following layer structure was established.

Light reflection layer (99.99 wt % Ag/Cu(0.003 wt %)) (140 nm)
Second upper protective layer (SiC) (4 nm)
First upper protective layer ($ZnS.SiO_2$) (11 nm)
Light absorbing layer ($Ag_{0.5}Ge_{1.5}In_8Sb_{70}Te_{20}$) (16 nm)
Lower protective layer ($ZnS.SiO_2$) (80 nm)
Polycarbonate substrate (0.6 mm)

Then an overcoat layer was formed on the Ag light reflection layer by coating an ultraviolet crosslinking resin using a spin coating method. Thus, a single plate disc was formed.

Then another polycarbonate substrate was adhered on the overcoat layer using an ultraviolet crosslinking adhesive. Thus, an optical information recording medium having a structure as shown in FIG. 2 was prepared.

The thus prepared optical information recording medium was initialized (i.e., entirely crystallized) using an initializer having a large-caliber laser diode (LD) having a beam diameter of 200×1 μm. The initializing conditions were as follows:

Linear speed: 3.0 m/s (constant)
Electric power: 850 mW
Feeding pitch: 100 μm
Scanning direction: from inside to outside As a result, the resultant optical information recording medium did not cause a bending problem caused by internal stress of Ag in the light reflection layer and had good mechanical properties.

Then the thus prepared phase-change optical information recording medium was subjected to optical information recording such that the recorded signals could be reproduced by a DVD-ROM drive. The recording conditions are as follows:

Recording speed: 16.75 m/s
Wavelength of light: 650 nm
Open area ratio (NA): 0.65
Recording power: 14.5 mW
Minimum mark length: 0.4 μm After overwriting was performed 1000 times, the Data-to-Clock-Jitter was 8.5% (i.e., the Data-to-Clock-Jitter was good). In addition, the recording medium had good signal characteristics and the reflectance and modulation were 20% and 63%, respectively. Namely, it can be said that the optical recording medium effectively utilizes the characteristics of Ag (i.e., high reflectance and heat conductivity).

The thus recorded optical recording medium was preserved for 500 hours under an environmental condition of 80° C. and 85% RH, the reflectance (20%) and modulation (63%) did not change. The cross section of the Ag light reflection layer of the recording medium was observed by a TEM (transmittance electron microscope) before and after the preservation test. In addition, the Ag light reflection layer was subjected to an electron diffraction analysis before and after the preservation test. As a result thereof, CuO and CuS were observed at the grain boundary of Ag crystals after the preservation test whereas Cu was observed at the grain boundary of Ag crystals before the preservation test. Namely, it is found that corrosion of Ag is prevented by forming CuO and CuS at the grain boundary of Ag crystals.

Thus, by adding Cu in an amount of 0.003% by weight to pure Ag having a purity of 99.99% by weight, corrosion of Ag can be prevented while the characteristics of Ag such as high reflectance and heat conductivity are effectively utilized for the light reflection layer.

Example 2

A polycarbonate substrate which has a thickness of 0.6 mm and in which a guide groove having a width of 0.25 μm and a depth of 27 nm is formed was prepared by an injection molding method. On the polycarbonate substrate, a lower protective layer of $ZnS.SiO_2$ (the content of $SiO_2$ is 20 mole %) having a thickness of 80 nm, a light absorbing layer having a formula of $Ge_2Ga_5Sb_{73}Te_{20}$ and a thickness of 16 nm, a first upper protective layer of $ZnS.SiO_2$ (the content of $SiO_2$ is 20 mole %) having a thickness of 11 nm, a second upper protective layer of SiC having a thickness of 4 nm and a Ag light reflection layer having a thickness of 140 nm and made of Ag having a purity of 99.99% by weight in which Fe and Al are added in an amount of 0.0005% by weight, respectively, were formed in this order by sputtering. The Ag light reflection layer was formed while the temperature of the substrate and filming speed were controlled to be 70° C. and 120 nm/s, respectively, to control the particle diameter of the Ag crystals to be 60 nm.

Thus, the following layer structure was established.
Light reflection layer (99.99wt % Ag/Fe(0.0005 wt %).Al (0.0005 wt %)) (140 nm)
Second upper protective layer (SiC) (4 nm)
First upper protective layer ($ZnS.SiO_2$) (11 nm)
Light absorbing layer ($Ge_2Ga_5Sb_{73}Te_{20}$) (16 nm)
Lower protective layer ($ZnS.SiO_2$) (80 nm)
Polycarbonate substrate (0.6 mm)

Then an overcoat layer was formed on the Ag light reflection layer by coating an ultraviolet crosslinking resin using a spin coating method. Thus, a single plate disc was formed.

Then another polycarbonate substrate was adhered on the overcoat layer using an ultraviolet crosslinking adhesive. Thus, an optical information recording medium having a structure as shown in FIG. 2 was prepared.

The thus prepared optical information recording medium was initialized (i.e., entirely crystallized) using an initializer having a large-caliber laser diode (LD) having a beam diameter of 200×1 μm. The initializing conditions were as follows:

Linear speed: 3.0 m/s (constant)
Electric power: 850 mW
Feeding pitch: 100 μm
Scanning direction: from inside to outside As a result, the resultant optical information recording medium did not cause a bending problem caused by internal stress of Ag in the light reflection layer and had good mechanical properties.

Then the thus prepared phase-change optical information recording medium was subjected to optical information recording such that the record could be reproduced by a DVD-ROM drive. The recording conditions are as follows:

Recording speed: 16.75 m/s
Wavelength of light: 650 nm
Open area ratio (NA): 0.65
Recording power: 14.5 mW
Minimum mark length: 0.4 μm After overwriting was performed 1000 times, the Data-to-Clock-Jitter was 8.0% (i.e., the Data-to-Clock-Jitter was good). In addition, the recording medium had good signal characteristics and the reflectance and modulation were 21% and 60%, respectively. Namely, it can be said that the optical recording medium effectively utilizes the characteristics of Ag (i.e., high reflectance and heat conductivity).

The thus recorded optical recording medium was preserved for 500 hours under an environmental condition of 80° C. and 85% RH, the reflectance (21%) and modulation (60%) did not change. The cross section of the Ag light reflection layer of the recording medium was observed by a TEM (transmittance electron microscope) before and after the preservation test. In addition, the Ag light reflection layer was subjected to an electron diffraction analysis before and after the preservation test. As a result thereof, FeSx (x is from 1.0 to 1.5) and AlOx (x is from 1.0 to 1.5) were observed at the grain boundary of Ag crystals after the preservation test whereas Fe and Al were observed at the grain boundary of Ag crystals before the preservation test. Namely, it is found that corrosion of Ag is prevented by forming FeSx and AlOx at the grain boundary of Ag crystals.

Thus, by adding Fe and Al in an amount of 0.0005% by weight, respectively, to pure Ag having a purity of 99.99% by weight, corrosion of Ag can be prevented while the characteristics of Ag such as high reflectance and heat conductivity are effectively utilized for the light reflection layer.

Example 3

A polycarbonate substrate which has a thickness of 0.6 mm and in which a guide groove having a width of 0.25 μm and a depth of 100 nm is formed was prepared by an injection molding method. On the polycarbonate substrate, a light absorbing layer was formed by spin-coating an alcohol solution of an azo dye. The thickness of the light absorbing layer at the groove was 120 nm.

Then a Ag light reflection layer was formed thereon by sputtering Ag having a purity of 99.99% by weight in which Mg and Zn are included in an amount of 0.0001% by weight, respectively. The light reflection layer has a thickness of 100 nm. The sputtering operation was performed while the temperature of the substrate and filming speed were controlled so as to be 50° C. and 120 nm/s, respectively, to control the particle diameter of the Ag crystals to be 30 nm.

Thus, the following layer structure was established.
Light reflection layer (99.99 wt % Ag/Mg(0.0001 wt %).Zn(0.0001 wt %)) (100 nm)
Light absorbing layer (Azo dye) (120 nm)
Polycarbonate substrate (0.6 mm)

Then an overcoat layer was formed on the Ag light reflection layer by coating an ultraviolet crosslinking resin using a spin coating method. Thus, a single plate disc was formed.

Then another polycarbonate substrate was adhered on the overcoat layer using an ultraviolet crosslinking adhesive. Thus, an optical information recording medium having a structure as shown in FIG. 4 was prepared. The resultant optical information recording medium did not cause a bending problem caused by internal stress of Ag in the light reflection layer and had good mechanical properties.

Then the thus prepared phase-change optical information recording medium was subjected to optical information recording such that the recorded signals could be reproduced by a DVD-ROM drive. The recording conditions are as follows:

Recording linear speed: 16.75 m/s

Wavelength of light: 650 nm

Open area ratio (NA): 0.65

Recording power: 15 mW

Minimum mark length: 0.4 μm

After overwriting was performed 1000 times, the Data-to-Clock-Jitter was 7.5% (i.e., the Data-to-Clock-Jitter was good). In addition, the optical recording medium had good signal characteristics and the reflectance and modulation were 65% and 65%, respectively. Namely, it can be said that the recording medium effectively utilizes the characteristic of Ag, i.e., high reflectance. When the information recorded in the recording medium was reproduced by a DVD-ROM drive, the information could be reproduced without causing any problem.

The thus recorded optical recording medium was preserved for 500 hours under an environmental condition of 80° C. and 85% RH, the reflectance (65%) and modulation (65%) did not change. The cross section of the Ag light reflection layer of the recording medium was observed by a TEM (transmittance electron microscope) before and after the preservation test. In addition, the Ag light reflection layer was subjected to an electron diffraction analysis before and after the preservation test. As a result thereof, ZnS and MgO were observed at the grain boundary of Ag crystals after the preservation test whereas Zn and Mg were observed at the grain boundary of Ag crystals before the preservation test. Namely, it is found that corrosion of Ag can be prevented by forming ZnS and MgO at the grain boundary of Ag crystals.

Thus, by adding Zn and Mg in an amount of 0.0001% by weight, respectively, to pure Ag having a purity of 99.99% by weight, corrosion of Ag can be prevented while the characteristics of Ag such as high reflectance and heat conductivity are effectively utilized for the light reflection layer.

Examples 4 to 11

The procedures for preparation and evaluation of the optical information recording medium in Example 1 were repeated except that Cu added in the Ag light reflection layer was replaced with Bi (Example 4), Ca (Example 5), Cd (Example 6), Mn (Example 7), Ni (Example 8), Pd (Example 9), Pd (Example 10) or Sb (Example 11).

As a result, the optical information recording media of Examples 4 to 11 had mechanical properties and recording qualities as good as those of the optical information recording medium of Example 1.

Example 12

The procedures for preparation and evaluation of the optical information recording medium in Example 1 were repeated except that the formula of the light absorbing layer was changed to $Ge_2In_8Sb_{70}Te_{20}$.

After overwriting was performed 100 times, the Data-to-Clock-Jitter was 8.5%. In addition, the optical recording medium had good signal characteristics, and the reflectance and modulation were 20% and 63%, respectively. The reflectance and modulation did not change even after the preservation test.

Example 13

The procedures for preparation and evaluation of the optical information recording medium in Example 3 were repeated except that the dye of the light absorbing layer was changed to a squarilium dye.

After overwriting was performed 100 times, the Data-to-Clock-Jitter was 7.5%. In addition, the optical recording medium had good signal characteristics, and the reflectance and modulation were 65% and 65%, respectively. The reflectance and modulation did not change even after the preservation test.

Examples 14 to 21

The procedures for preparation and evaluation of the optical information recording medium in Example 12 were repeated except that Cu added in the Ag light reflection layer was replaced with Bi (Example 14), Ca (Example 15), Cd (Example 16), Mn (Example 17), Ni (Example 18), Pd (Example 19), Pd (Example 20) or Sb (Example 21).

As a result, the optical information recording media of Examples 14 to 21 had mechanical properties and recording qualities as good as those of the optical information recording medium of Example 12.

As can be understood from the above-description, the optical information recording medium of the present invention has good light reflection layer having little internal stress, and the signals recorded therein have good jitter properties.

Therefore, the optical information recording medium of the present invention has good ROM drive compatibility.

In the optical information recording medium of the present invention, the characteristics of Ag such as high reflectance and heat conductivity can be effectively utilized while corrosion of Ag is prevented.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications Nos. 2001-193780 and 2001-193779, both filed on Jun. 26, 2001, the entire contents of which are herein incorporated by reference.

What is claimed is:

1. An optical information recording medium comprising:
   a substrate;
   a light absorbing layer which is located overlying the substrate and in which marks are formed to store information; and
   a light reflection layer which is located overlying the light absorbing layer and which comprises a crystal, wherein the light reflection layer has a thickness, wherein the optical information recording medium satisfies the following relationship:

$$Lt/4 \leq Lc \leq Lm,$$

wherein Lc represents an average particle diameter of the crystal of the light reflection layer; Lm represents a minimum length of the marks formed in the light absorbing layer and is not greater than 0.4 µm; and Lt represents the thickness of the light reflection layer; and wherein the light reflection layer comprises Ag.

2. An optical information recording medium comprising:
a substrate;
a light absorbing layer which is located overlying the substrate and in which marks are formed to store information; and
a light reflection layer which is located overlying the light absorbing layer and which comprises a crystal, wherein the light reflection layer has a thickness,
wherein the optical information recording medium satisfies the following relationship:

$$Lt/4 \leq Lc \leq Lm,$$

wherein Lc represents an average particle diameter of the crystal of the light reflection layer; Lm represents a minimum length of the marks formed in the light absorbing layer; and Lt represents the thickness of the light reflection layer; and wherein the light reflection layer comprises Ag having a purity not less than 99% by weight and includes at least one metal having a normal electrode potential less than that of Ag in an amount of from 0.00005 to 0.005% by weight based on weight of Ag included in the light reflection layer.

3. The optical information recording medium according to claim 2, wherein said at least one metal is selected from the group consisting of Al, Bi, Ca, Cu, Cd, Fe, Mn, Mg, Ni, Pd, Pb, Sb and Zn.

4. The optical information recording medium according to claim 2, wherein said at least one metal is present at least at a grain boundary of the crystal in the light reflection layer.

5. An optical information recording medium comprising:
a substrate;
a light absorbing layer which is located overlying the substrate and in which marks are formed to store information; and
a light reflection layer which is located overlying the light absorbing layer and which comprises a crystal, wherein the light reflection layer has a thickness,
wherein the optical information recording medium satisfies the following relationship:

$$Lt/4 \leq Lc \leq Lm,$$

wherein Lc represents an average particle diameter of the crystal of the light reflection layer; Lm represents a minimum length of the marks formed in the light absorbing layer; and Lt represents the thickness of the light reflection layer; and wherein the light reflection layer includes Ag in an amount not less than 99% by weight based on total weight of the light reflection layer.

6. The optical information recording medium according to claim 5, wherein the light reflection layer includes Ag in an amount not less than 99.9% by weight based on total weight of the light reflection layer.

7. An information recording method comprising:
forming marks in an optical information recording medium comprising a substrate; a light absorbing layer overlying the substrate and in which said marks, having a minimum mark length Lm, are formed to store information; and a light reflection layer having a thickness Lt overlying the light absorbing layer and comprising crystals with an average particle diameter Lc such that $Lt/4 \leq Lc \leq Lm$, wherein said crystals have grain boundaries, wherein said light reflection layer comprises Ag having a purity not less than 99% by weight and includes at least one metal having a normal electrode potential less than that of Ag in an amount of from 0.00005 to 0.005% by weight based on weight of Ag in the light reflection layer, and wherein said at least one metal is present at least at grain boundaries of crystals in the light reflection layer.

8. An information recording method comprising:
applying light irradiation to an optical information recording medium to form marks therein, with a minimum mark length Lm, said optical information recording medium comprising a substrate, a light absorbing layer overlying the substrate and in which said marks are formed to store information, and a light reflection layer having a thickness Lt overlying the light absorbing layer and comprising crystals with an average particle diameter Lc such that $Lt/4 \leq Lc \leq Lm$, wherein said crystals have grain boundaries, wherein said light reflection layer comprises Ag having a purity not less than 99% by weight and includes at least one metal having a normal electrode potential less than that of Ag in an amount of from 0.00005 to 0.005% by weight based on weight of Ag in the light reflection layer, and wherein said at least one metal is present at least at grain boundaries of crystals in the light reflection layer.

9. The optical information recording medium according to claim 1, wherein said medium is compatible with DVD-ROM.

10. The optical information recording medium according to claim 1, wherein said medium is a phase change medium.

11. The optical information recording medium according to claim 1, wherein the average particle diameter is not less than 0.1 µm.

* * * * *